(12) United States Patent
Hofmann et al.

(10) Patent No.: US 7,631,948 B2
(45) Date of Patent: Dec. 15, 2009

(54) WHEEL HUB COMPRISING AXIAL RECESSES FORMED BETWEEN THE HOLES FOR WHEEL NUTS

(75) Inventors: Heinrich Hofmann, Schweinfurt (DE); Horst Doeppling, Herzogenaurach (DE); Peter Niebling, Bad Kissingen (DE); Robert Plank, Weisendorf (DE)

(73) Assignee: Schaeffler KG, Herzogenaurach (DE)

( * ) Notice: Subject to any disclaimer, the term of this patent is extended or adjusted under 35 U.S.C. 154(b) by 0 days.

(21) Appl. No.: 12/092,489

(22) PCT Filed: Nov. 2, 2006

(86) PCT No.: PCT/DE2006/001916

§ 371 (c)(1),
(2), (4) Date: Jul. 11, 2008

(87) PCT Pub. No.: WO2007/051452

PCT Pub. Date: May 10, 2007

(65) Prior Publication Data

US 2008/0265660 A1    Oct. 30, 2008

(30) Foreign Application Priority Data

Nov. 3, 2005    (DE) .................... 10 2005 052 471

(51) Int. Cl.
*B60B 27/00*    (2006.01)
(52) U.S. Cl. ............... 301/105.1; 301/6.8; 301/111.04
(58) Field of Classification Search ............ 301/6.1, 301/6.3, 6.8, 105.1, 111.01, 111.03, 111.04; 188/17, 18 R, 18 A, 218 XL, 218 R
See application file for complete search history.

(56) References Cited

U.S. PATENT DOCUMENTS

| 4,699,433 | A | * | 10/1987 | Kopp ...................... 301/6.6 |
| 6,039,407 | A | * | 3/2000 | Wiacek et al. .......... 301/111.04 |
| 7,111,911 | B2 | * | 9/2006 | Baumgartner et al. .... 301/105.1 |

FOREIGN PATENT DOCUMENTS

| EP | 0 834 670 A | 4/1998 |
| EP | 1 500 524 A | 1/2005 |
| GB | 2 351 950 Y | 1/2001 |
| JP | 07 317755 YA | 12/1995 |
| JP | 2003 094905 A | 4/2003 |

* cited by examiner

*Primary Examiner*—Jason R Bellinger
(74) *Attorney, Agent, or Firm*—Lucas & Mercanti, LLP

(57) ABSTRACT

The invention relates to a wheel hub having a central section and a radial section which is radially connected to the central section, a bearing section which axially protrudes from the central section and is used to receive a wheel bearing, and an axially opposing receiving section for receiving a brake disk and a wheel rim. Holes for receiving wheel nuts are formed in the radial section. In order to produce an especially light wheel hub that can withstand all operating loads and provides a brake disk with a secure abutment surface under all operating conditions, the wheel hub has recesses at least between some holes, the recesses fully penetrating the wall of the radial section of the wheel hub.

9 Claims, 2 Drawing Sheets

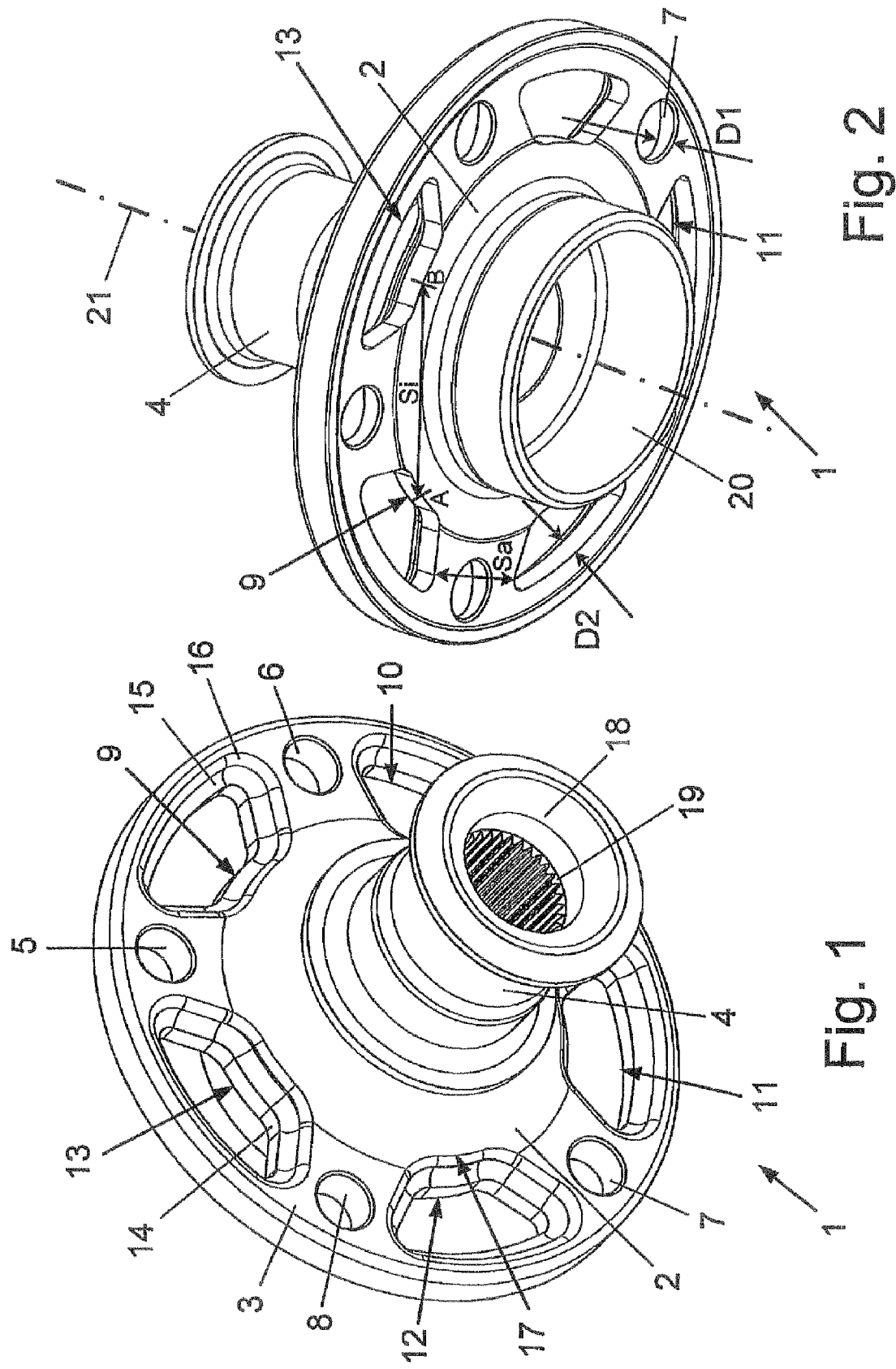

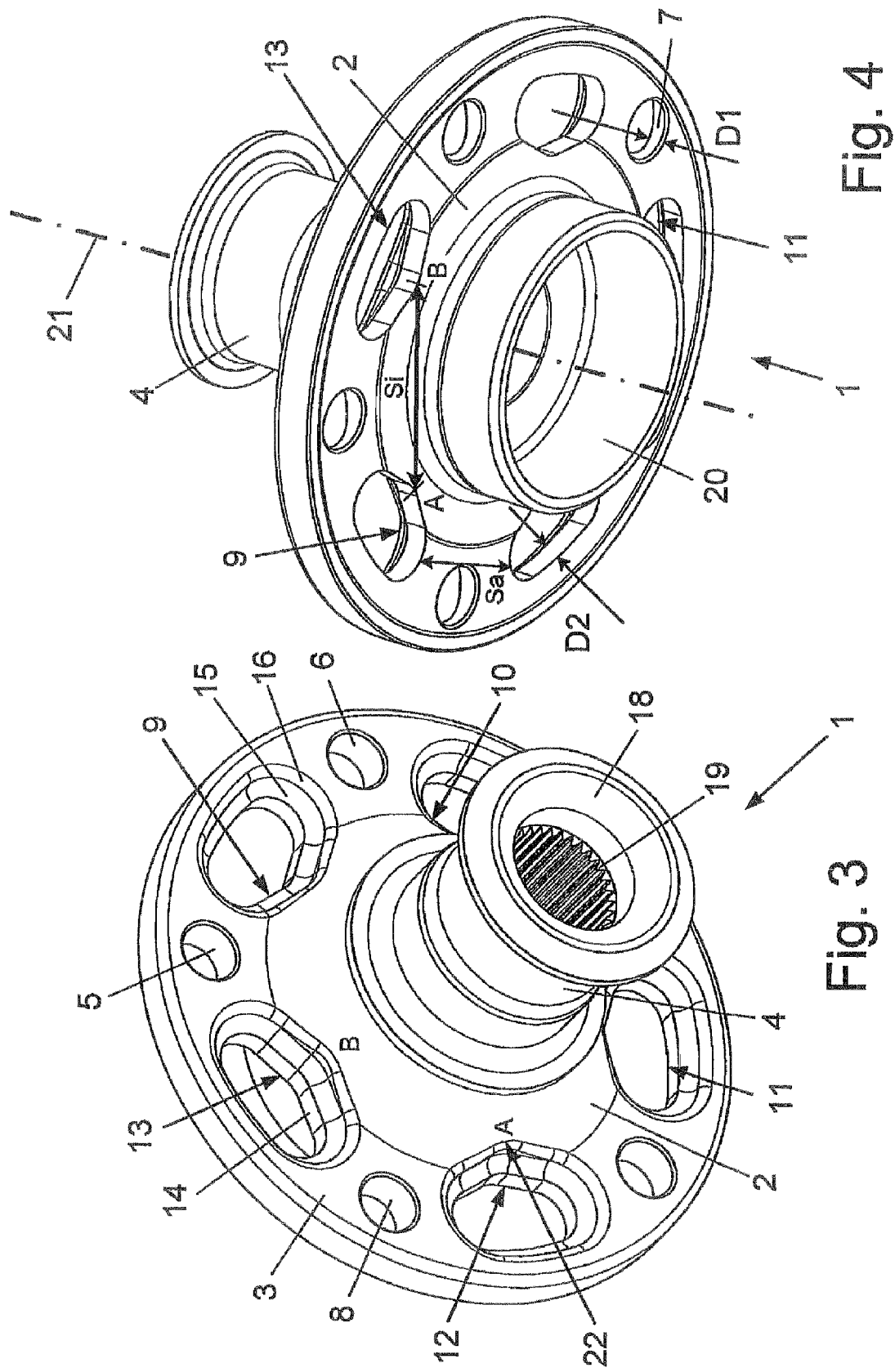

WHEEL HUB COMPRISING AXIAL RECESSES FORMED BETWEEN THE HOLES FOR WHEEL NUTS

FIELD OF THE INVENTION

The invention relates to a wheel hub having a central section and having a radial section which radially adjoins said central section, having a bearing section, which projects axially from the central section, for holding a wheel bearing and having an axially opposite holding section for holding a brake disk and a wheel rim, with holes for holding wheel bolts being formed in the radial section.

BACKGROUND OF THE INVENTION

Wheel hubs for motor vehicles are known to a person skilled in the art in many embodiment variants. Said wheel hubs are used in motor vehicles as a joining element between a driveshaft and a vehicle wheel. For connection to the driveshaft, a wheel hub conventionally has a central holding section with a plug-in toothing into which the free end of the driveshaft can be inserted. For fastening the rim of a vehicle wheel, holes with screw threads are formed in a radial section of the wheel hub, into which holes, with the interposition of a disk brake, wheel bolts can be screwed. Wheel hubs also conventionally have an axial section for holding and radially centering the wheel rim or the brake disk.

It is also known for wheel hubs of said type to be formed with non-continuous material recesses in order to reduce the masses which rotate with the vehicle wheel during operation of the vehicle, as a result of which the driving behavior of the vehicle can be improved.

OBJECT OF THE INVENTION

Against this background, it is an object of the invention to further develop a wheel hub of said type in such a way that, while having dimensions similar to conventional wheel hubs, the mass of said wheel hub is reduced. At the same time, the wheel hub should have a high resistance to tilting and warping and should ensure precise guidance of the brake disk and the rim both with regard to the tightening torques of the wheel bolts and also with regard to forces which occur during operation.

SUMMARY OF THE INVENTION

To achieve said object, a wheel hub having the features of the main claim is provided. Advantageous refinements and embodiments of the invention can be gathered from the subclaims.

Accordingly, a wheel hub is proposed, having a central section and having a radial section which adjoins said central section, having a bearing section, which projects axially from the central section, for holding a wheel bearing and having an axially opposite holding section for holding a brake disk and a wheel rim, with holes for holding wheel bolts being formed in the radial section. In said wheel hub, it is also provided that, at least between some holes in the radial section, recesses are formed which extend completely through the wall of the radial section.

By means of the proposed technical solution, a wheel hub is accordingly created which has axial device components for connecting to a vehicle driveshaft, for holding a wheel bearing and for holding a brake disk and a wheel rim. Here, said wheel hub has a radial section which, as a result of the holes for the wheel bolts and the continuous recesses, constitutes a highly lightweight construction. Corresponding to the respective dimensions and/or mechanical demands on the wheel hub, the latter can be constructed according to the following features.

According to a first embodiment, it is provided that the recesses are formed so as to be distributed uniformly over the periphery of the wheel hub between in each case two holes of the radial section.

Corresponding to a further preferred feature of the invention, it is provided that, between two adjacent recesses, the radially outer shortest spacing Sa between said recesses is smaller than a spacing Si between two points A, B of the smallest radial distance of the recesses from the rotational axis of the wheel hub. This principle ensures that the best combination of weight reduction, high component strength and favorable stress distribution in the wheel hub can be realized.

According to said construction principle, the recesses therefore have, in cross section with respect to the radial plane of the radial section, preferably a substantially trapezoidal, kidney-shaped or triangular geometry with preferably rounded corners.

It can also be provided that the recesses, as viewed in the direction of the bearing section, have a first axial section, a second axial section which adjoins the said first axial section and a third axial section which adjoins said second axial section. While the wall faces of the recesses in the first axial section run substantially perpendicular to the radial plane of the radial section, that is to say parallel to the rotational axis of the wheel hub, the wall faces of the latter two sections of the recesses are inclined with respect to said radial plane with different, and axially decreasing, angles of less than 90°. As a result, the recesses have openings which widen in a stepped fashion.

According to a further feature, it can be provided that the central section is of conical design, with the central section tapering axially in the direction of the bearing section. As a result of this design detail, a particularly reliable torque transmission from the central section of the wheel hub into its filigree radial section is obtained. In addition, a brake disk is provided with an enlarged axial contact face as a result of the conical profile.

Another refinement of the construction of the wheel hub provides that the recesses extend radially into the conical region of the central section. In the case of trapezoidal or kidney-shaped recesses, it is also preferably provided that their short side points radially inward in the direction of the rotational axis of the wheel hub, so that in the peripherally longer section of the radial section of the wheel hub, more material is removed than in the peripherally shorter, radially inner section thereof.

With regard to the substantially triangular recesses, it is provided that these are formed in the radial section of the wheel hub in such a way that their triangular tip points radially inward in the direction of the rotational axis of the wheel hub.

As a result of the radial section of the wheel hub having, in the region of the holes for the wheel bolts, an axial wall thickness D1 which is greater than the axial wall thickness D2 in the region of the first axial section of the recesses, it is obtained that, during shaping and boring of a wheel hub blank, a required component-related level of accuracy can be effectively adhered to and the respective production steps can be easily carried out.

BRIEF DESCRIPTION OF THE DRAWINGS

The invention is explained in more detail below on the basis of the appended drawing of two embodiments, in which:

FIG. 1 shows a first embodiment variant of a wheel hub designed according to the invention, viewed from the drive side, FIG. 2 shows the wheel hub as per FIG. 1, illustrated from the opposite side, FIG. 3 shows a second embodiment variant of a wheel hub according to the invention, viewed from the drive side, and FIG. 4 shows the wheel hub as per FIG. 3, illustrated from the opposite side.

DETAILED DESCRIPTION OF THE DRAWINGS

As shown in FIGS. 1 and 2, a wheel hub 1 designed according to the invention firstly has a central section 2 which is formed substantially perpendicular to the rotational axis 21 of the wheel hub 1. From said central section 2, a bearing section 4 for holding a wheel bearing (not shown) and a stepped holding section 20 for holding and centering a brake disk (not illustrated here) and a wheel rim (likewise not shown) extend coaxially with respect to the rotational axis 21. The bearing section 4 is designed such that an inner ring of the wheel bearing can be fastened to its radial outer face, while a plug-in toothing 19 for holding an axially toothed journal of a driveshaft is formed in its axial bore. The free axial end of the bearing section 4 is delimited by an annular bead 18.

The central section 2 of the wheel hub 1 is in this exemplary embodiment formed concentrically with respect to the rotational axis 21, with the diameter of said central section 2 decreasing from radially at the outside in the direction of the bearing section 4. The central section 2 merges at the periphery with the largest diameter into a radial section 3 which serves for fastening the brake disk and wheel rim which are pushed onto the holding section 20 of the wheel hub 1.

At least the wheel rim can be fastened by means of wheel bolts to the radial section 3 of the wheel hub 1. For this purpose, the wheel bolts are screwed into the holes 5, 6, 7 and 8 which are provided with screw threads (not illustrated).

Formed in the wheel hub 1 are recesses 9, 10, 11, 12 and 13 which extend through its radial wall and which are arranged so as to be distributed uniformly between the holes 5, 6, 7 and 8. In the exemplary embodiment illustrated in FIGS. 1 and 2, the recesses 9, 10, 11, 12 and 13 have a substantially trapezoidal cross-sectional geometry in the radial plane. Here, the peripherally longer side of the recesses is formed radially at the outside and the peripherally shorter side is formed radially at the inside on the radial section 3. As these FIGS. 1 and 2 clearly show, the recesses 9, 10, 11, 12 and 13 can extend radially into the conical central section 2.

The recesses 9, 10, 11, 12 and 13 have, as viewed in the direction of the bearing section 4, in each case three axial sections 14, 15 and 16, the first axial section 14 of which has wall faces which are aligned substantially parallel to the rotational axis 21 and perpendicular to the radial plane of the radial section 3, while the wall faces of the two axial sections 15 and 16 which adjoin said axial section 14 are inclined with respect to one another with different, and axially decreasing, angles of less than 90°.

It can also be provided, according to another advantageous embodiment, that the recesses 9, 10, 11, 12 and 13 have a curved profile 17 and/or overall rounded corners at their radially inner side. As a result, the recesses 9, 10, 11, 12 and 13 have an approximately kidney-shaped geometry. As a result of the described design of the edges and of the sides of the recesses 9, 10, 11, 12 and 13, a low-stress force profile within the wheel hub 1 is realized.

FIG. 2 shows that the wheel hub 1 has, on account of the stepped axial sections 13, 14, 15 of the recesses 9, 10, 11, 12 and 13, different wall thicknesses in the region of said recesses 9, 10, 11, 12 and 13 and in the region of the holes 5, 6, 7, 8. The wall thickness D1 in the region of the holes 5, 6, 7, 8 is thus greater than the wall thickness D2 in the region of the first axial section 13 of the recesses 9, 10, 11 and 13. The wall thickness D1 in the region of the holes 5, 6, 7, 8 is preferably more than double the wall thickness D2.

As a result of the design of the wall thicknesses, the integrity of the workpiece and a high level of production accuracy are ensured during the generation, during production, of the recesses 9, 10, 11, 12, 13 and of the holes 5, 6, 7, 8. Here, the recesses 9, 10, 11, 12 and 13 are preferably produced by means of a shaping process and the holes 5, 6, 7, 8 by means of boring.

According to a further aspect of the invention, it is provided that the recesses 9, 10, 11, 12, 13 are designed, with regard to their dimensions and their spacing, to be optimized in such a way that it is possible to produce as light a wheel hub 1 as possible which can absorb all of the operating loads which act on it without damage and which forms a peripherally non-corrugated contact face for a brake disk.

For this purpose, the recesses 9, 10, 11, 12, 13 are formed and spaced apart from one another in such a way that the radially outer shortest spacing Sa between two adjacent recesses is smaller than that spacing Si between two points A and B which mark the smallest radial spacing of the recesses 9, 10, 11, 12, 13 from the rotational axis 21 of the wheel hub 1.

As can be seen from FIGS. 3 and 4, the recesses 9, 10, 11, 12, 13 can also be of substantially oval design in their radially outer region and of comparatively tapered design in the region which points radially toward the rotational axis 21. Here, the tip 22 of the respective recesses 9, 10, 11, 12, 13 extends radially in the direction of the rotational axis 21 of the wheel hub 1. Said points A and B of two adjacent recesses 9, 10, 11, 12, 13 are defined here by the respective tip 22, as shown in particular by FIG. 4.

The invention claimed is:

1. A wheel hub, comprising:
    a central section having an axis of rotation;
    a radial section which extends radially outward from said central section;
    holes for wheel bolts formed in a wall of the radial section;
    recesses which extend completely through the wall of the radial section, each of the recesses formed between two adjacent holes;
    a bearing section which projects in a first axial direction from the central section, for holding a wheel bearing;
    a holding section for holding a brake disk and a wheel rim, the holding section projects in a second axial direction from the central section, the second axial direction axially opposite the first axial direction; and
    each of the recesses having inner axial walls that define the recess, the axial walls having a first axial section, a second axial section which axially adjoins the said first axial section and a third axial section which axially adjoins said second axial section, the first axial section having a surface running substantially perpendicular to the radial plane of the radial section, while the second axial section and the third axial section both having surfaces that are inclined with respect to said radial plane with different and axially decreasing angles of less than 90°.

2. The wheel hub as claimed in claim 1, wherein the recesses are distributed uniformly between two adjacent holes of the radial section.

3. The wheel hub as claimed in claim 1, wherein spacing between axial walls of two adjacent recesses closest to an external edge of the radial section is less than spacing between axial walls of the two adjacent recesses radially closest to the axis of rotation.

4. The wheel hub as claimed in claim 3, wherein the recesses are substantially trapezoidal.

5. The wheel hub as claimed in claim 4, wherein the recesses have two substantially parallel walls and the recesses are formed in the wheel hub in such a way that the side radially closest to the rotational axis of the wheel hub is shorter than the side radially closest to an external edge of the radial section.

6. The wheel hub as claimed in claim 1, wherein the central section is conical, with the central section tapering axially in the direction of the bearing section.

7. The wheel hub as claimed in claim 6, wherein the recesses extend radially into the central section.

8. The wheel hub as claimed in claim 1, wherein the radial section adjacent the holes, has an axial thickness which is greater than the axial thickness of the first axial section of the recesses.

9. The wheel hub as claimed in claim 1, wherein the recesses have rounded corners.

* * * * *